(12) United States Patent
Sabadie et al.

(10) Patent No.: US 8,540,191 B2
(45) Date of Patent: Sep. 24, 2013

(54) DEVICE FOR HOLDING AN INSULATING BLANKET AND FOR FASTENING TWO-PARTS SYSTEMS

(75) Inventors: Lionel Sabadie, Toulouse (FR);
Maximilien Fauvet, Toulouse (FR);
Laurent Rebolloso, Le Gres (FR);
Michel Dal-Cin, La Salvetat-Saint-Gilles (FR)

(73) Assignee: AIRBUS Operations (S.A.S.), Toulouse (FR)

( * ) Notice: Subject to any disclaimer, the term of this patent is extended or adjusted under 35 U.S.C. 154(b) by 87 days.

(21) Appl. No.: 13/165,115

(22) Filed: Jun. 21, 2011

(65) Prior Publication Data

US 2011/0309196 A1 Dec. 22, 2011

(30) Foreign Application Priority Data

Jun. 22, 2010 (FR) ...................... 10 02614

(51) Int. Cl.
*B64C 1/40* (2006.01)
*F16B 1/00* (2006.01)
(52) U.S. Cl.
USPC ......... 244/131; 244/119; 244/117 R; 248/214
(58) Field of Classification Search
USPC ............ 248/215, 309.1; 244/119, 131, 118.1
See application file for complete search history.

(56) References Cited

U.S. PATENT DOCUMENTS

| 5,263,665 | A | 11/1993 | Koneczny et al. |
| 5,680,680 | A | 10/1997 | LaConte |
| 5,797,573 | A | 8/1998 | Nasu |
| 6,702,509 | B2 * | 3/2004 | Rogers ........................... 403/385 |
| 7,059,565 | B2 * | 6/2006 | Scown et al. ............. 244/117 R |
| 2009/0072098 | A1 * | 3/2009 | Smallhorn .................... 248/68.1 |
| 2011/0315823 | A1 * | 12/2011 | Sabadie et al. ................ 244/131 |

FOREIGN PATENT DOCUMENTS

| EP | 0 561 107 A1 | 9/1993 |
| EP | 2293977 B1 * | 10/2012 |

OTHER PUBLICATIONS

U.S. Appl. No. 13/165,446, filed Jun. 21, 2011, Sabadie, et al.
U.S. Appl. No. 13/165,150, filed Jun. 21, 2011, Sabadie, et al.
U.S. Appl. No. 13/165,108, filed Jun. 21, 2011, Holvoet, et al.
U.S. Appl. No. 13/165,461, filed Jun. 21, 2011, Holvoet, et al.
French Preliminary Search Report issued on Mar. 22, 2011 in corresponding French Application No. 10 02614 filed on Jun. 22, 2010 (with an English Translation of Catergories).

* cited by examiner

*Primary Examiner* — Tien Dinh
*Assistant Examiner* — Michael Wang
(74) *Attorney, Agent, or Firm* — Oblon, Spivak, McClelland, Maier & Neustadt, L.L.P.

(57) ABSTRACT

A device for holding an insulating blanket and for fastening systems in an aircraft includes a base and at least one support. The base has two ends from each of which there extends an arm. One arm is a jointed arm that is jointed onto the base to be pivotable relative to the base. The at least one support is configured to accommodate a system. The base includes an elongated shape and defines a plane, the base includes two longitudinal edges, and at one end of the base, each longitudinal edge has a flange extending from the base on a same side of the base from which the arms extend.

8 Claims, 3 Drawing Sheets

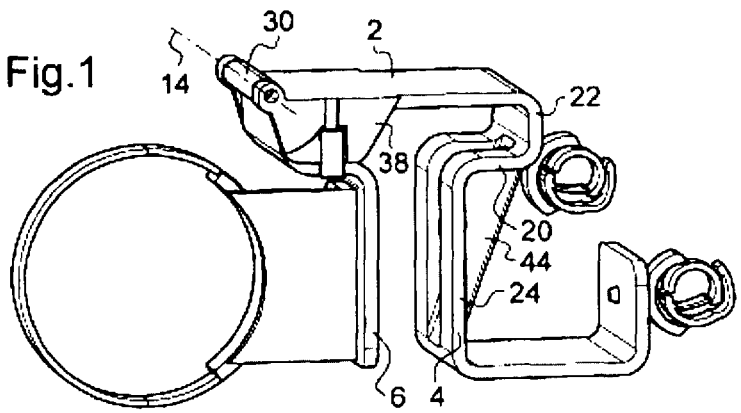
Fig.1
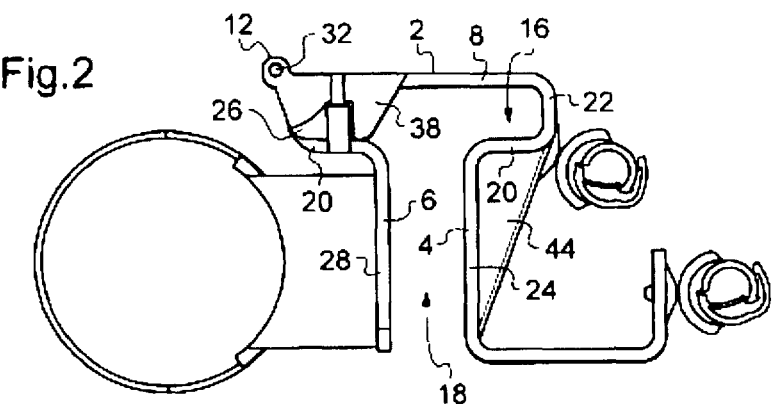
Fig.2
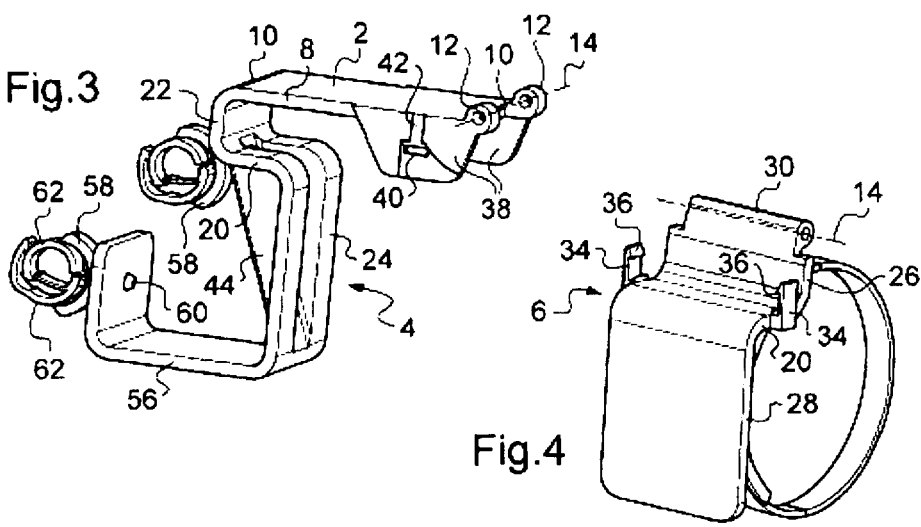
Fig.3
Fig.4

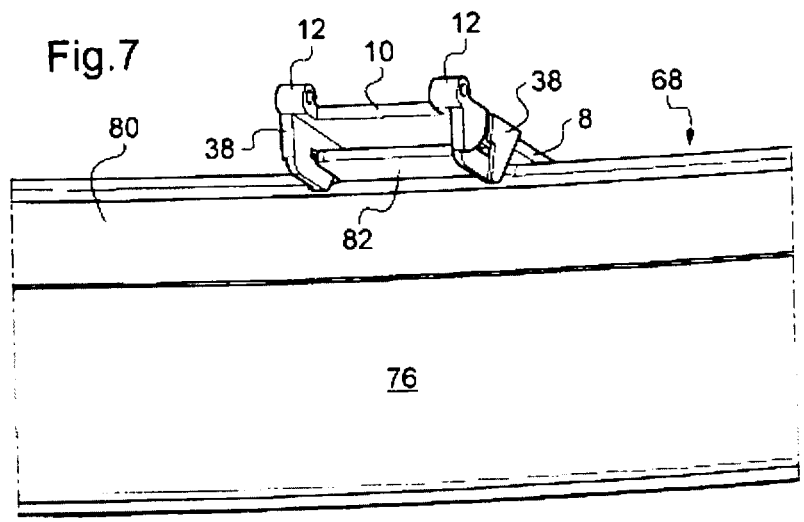
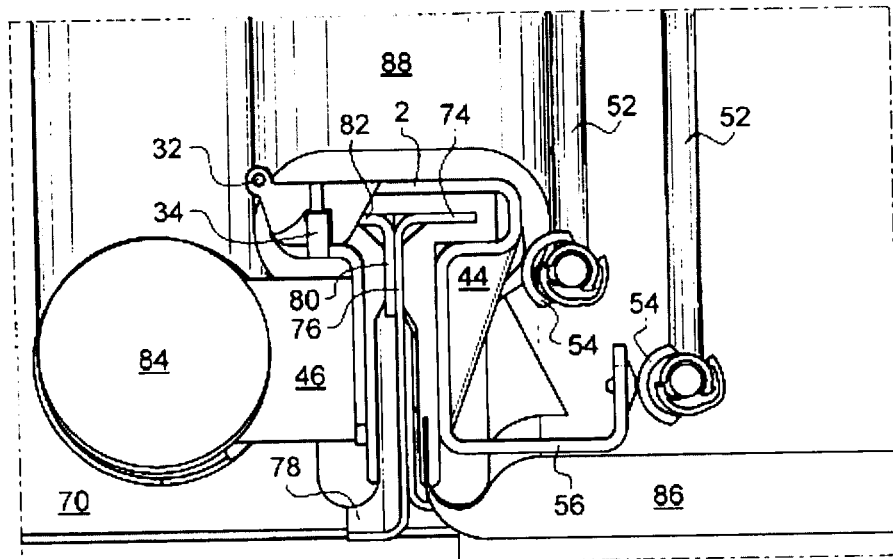

DEVICE FOR HOLDING AN INSULATING BLANKET AND FOR FASTENING TWO-PARTS SYSTEMS

This invention relates to a device for holding an insulating blanket and for fastening two-part systems. This invention relates to the aeronautical field and more particularly aircraft construction.

An aircraft fuselage usually has a structure made up of frames and stringers. The exterior shell of the fuselage is fastened onto the frames and stringers. When the aircraft is intended to fly at high altitude, considering the outside temperatures to which it is to be subjected, it is necessary to implement a thermal insulation of the fuselage. It then is known to cover the interior face of the skin forming the shell of the fuselage with insulating blankets in the form of flexible strips or panels. These blankets are called skin blankets. It also is advisable to thermally insulate each frame. There then are used blankets having a structure similar to that of the skin blankets, but the shape of which is adapted for coming to encase the frames inside the fuselage. These blankets hereinafter are called frame blankets.

The frames of the fuselage also serve as supports for various systems. By systems there is understood here equipment items of the aircraft as well as the electrical wirings, the hydraulic systems, the pneumatic systems, the air ducts for ventilation and pressurization inside the fuselage, . . .

Holes then are made in the frames of the fuselage on the one hand to allow fastening of the insulating blankets and on the other hand to allow support and fastening of systems. These holes weaken the frames and sometimes must be compensated for by structural reinforcements, which thus complicates the design of the aircraft.

Moreover, as regards the blankets, it is advisable to adapt their shape to the various fastening devices provided. Holes, cut-outs, notches, . . . must be provided in the blankets to allow passage of a fastening device, fitting to the structure of the fuselage, . . . The holes and notches made in the blankets degrade their insulating performance and are sources of thermal (and acoustic) bridges and they thus reduce the performances of the blankets.

It therefore is advisable at the same time to limit the number of holes made in the structure of the aircraft (frame and/or other structural part) as well as in the insulating blankets (skin blankets and frame blankets).

The document FR-2 933 376 thus shows, for example, a device for fastening an insulting blanket and a method for installing an insulating blanket in an aircraft fuselage making it possible to limit the number of holes to be made in the frames of the aircraft. The device described in this document comprises a portion forming a hook adapted for coming to cap a flank of the frame and grip the latter by itself or in cooperation with a structural element of the aircraft so as to ensure fastening of the device to the frame. One embodiment of this device comprises a first frame-blanket clip borne by a first member intended to extend on the first side of the frame, a second frame-blanket clip borne by a second member intended to extend on the second side of the frame, a first skin-blanket clip borne by the first member and a second skin-blanket clip borne by the second member.

This invention then has as a purpose to provide a system allowing on the one hand the holding of insulating blankets and on the other hand the support of systems while at the same time limiting the holes to be made in the structure of the aircraft (frame, . . . ) and on the other hand in the said insulating blankets.

Advantageously, the implementation of such a system will be easy and/or at a limited cost price and/or with a mass as small as possible.

To this end, this invention proposes a device for holding an insulating blanket and fastening systems in an aircraft, comprising a base having two ends from each of which an arm extends.

According to this invention, one arm is jointed onto the base, and the said device further comprises at least one support for accommodating a system.

The structure comprising the base and the two arms makes it possible to mount the device on a frame and to hold an insulating blanket. The fact of having a jointed arm makes it possible to facilitate mounting of the device and a better holding of the insulating blanket.

In a preferred embodiment of a device according to this invention, it is provided that the base of elongated shape defines a plane, referred to as reference plane, comprising two longitudinal edges, and that at one end of the base, each longitudinal edge has a flange extending from the base on the same side as the arms. These flanges may be used, for example, for a positioning of the device on a structure of the aircraft, as will be indicated farther on. They also may be used to produce a locking of the movable arm in relation to the base.

As suggested in the preceding paragraph, locking means thus advantageously are provided between the jointed arm and the base. In the case where, as provided above, the base is equipped with flanges, the jointed arm may have, for example, at least one elastic hook; at least one flange then advantageously has at least one slot intended to cooperate with a corresponding elastic hook in order to hold the jointed arm in a predetermined position in relation to the base. In this embodiment variant, a groove extending from the plane face of the base as far as the slot advantageously is made in the corresponding flange. This groove makes it possible in particular to access the locking means with the free end of a screwdriver. In that way, it is possible to easily access these locking means, for example to bring about an unlocking.

This invention also relates to an aircraft fuselage section, comprising frames, an outer skin fastened onto the frames, at least one insulating blanket, characterized in that an insulating blanket is fastened onto a frame with the aid of at least one device such as described above. In such a section, the said frame is situated, for example, at least partially between the arms of the said device and the said insulating blanket is situated between the said frame and the said device.

In a preferred embodiment of the invention, the aircraft fuselage section according to the invention is such that the frame is a sectional piece with a Z-shaped cross section with a core and two flanges, and in that at the end of the frame opposite the outer skin, the frame bears tongue pieces that extend more or less in the continuation of the corresponding flange but on the side opposite the core so as to form locally an end having a T-shaped section.

In an aircraft fuselage section such as defined in the preceding paragraph, the insulating-blanket holding device is, for example, such that the base of elongated shape defines a plane, referred to as reference plane, and comprises two longitudinal edges and such that at one end of the base, each longitudinal edge has a flange extending from the base on the same side as the arms. Then, advantageously, the two flanges are disposed on both sides of a tongue piece.

Finally, this invention also relates to an aircraft, characterized in that it comprises at least one fuselage section such as described above.

Details and advantages of this invention will become more apparent from the description that follows, presented with reference to the attached schematic drawings on which:

FIG. 1 shows in perspective a device according to this invention,

FIG. 2 shows the device of FIG. 1 in elevation,

FIG. 3 shows a first part of the device shown on FIGS. 1 and 2,

FIG. 4 shows a second part of the device shown on FIGS. 1 and 2,

Figure 5:
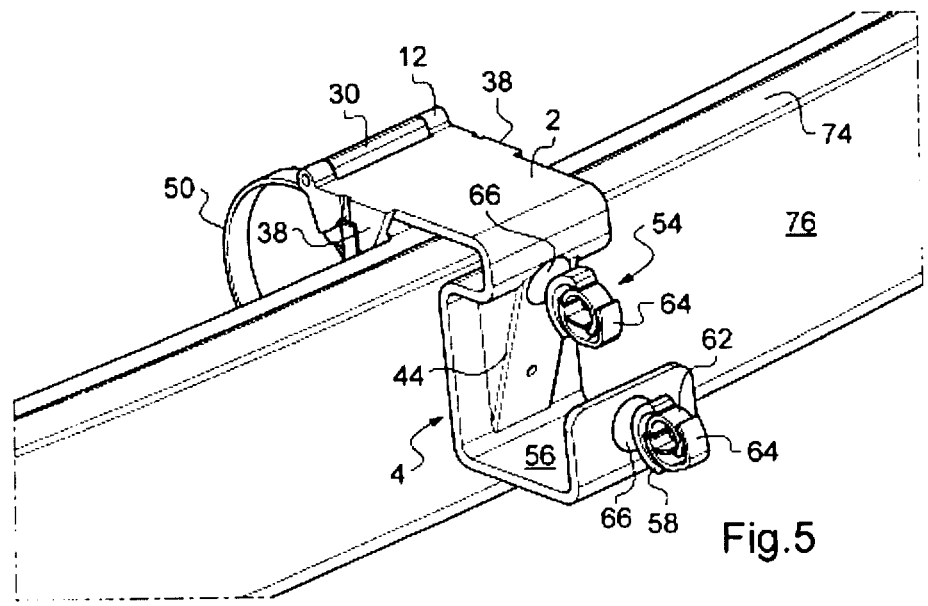
Figure 6:
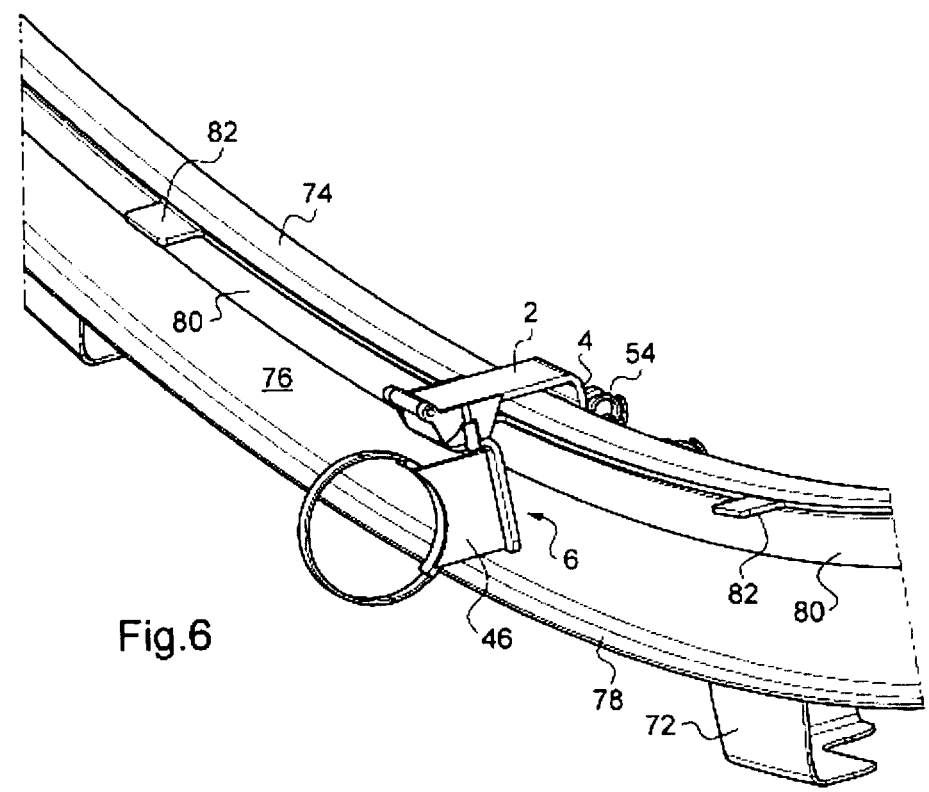

FIG. 5 is a first perspective view of a device according to this invention, such as shown on FIGS. 1 and 2, positioned on an aircraft structure, FIG. 6 corresponds to FIG. 5 from another viewing angle, FIG. 7 shows the part shown on FIG. 3 in position on the structure of FIGS. 5 and 6, and FIG. 8 shows a device according to this invention bearing systems and mounted on an aircraft structure while holding insulating blankets.

FIGS. 1 and 2 show a device in the shape of a stirrup comprising a base 2 from which two arms extend. It will be assumed arbitrarily that base 2 extends in a horizontal plane and that the arms extend from base 2 vertically downward. A first arm, shown on the right on FIGS. 1 and 2, is called fixed arm 4. The other arm, on the left on FIGS. 1 and 2, is called movable arm 6. Whereas fixed arm 4 forms only a single part with base 2, movable arm 6 is a separate part jointed onto base 2.

Base 2 is plane and of elongated rectangular shape. It thus has two longitudinal edges 8 and two transverse edges 10. Fixed arm 4 and movable arm 6 are borne by transverse edges 10. On the movable arm 6 side, base 2 bears on its transverse edge 10, at the ends thereof, a bearing 12 in each instance. These two bearings 12 define a horizontal pivot pin 14, more or less parallel to transverse edges 10 of base 2.

On FIGS. 1 and 2, the device according to the invention is shown in its position referred to as closed, that is to say in a position in which it can achieve holding of an insulating blanket on an aircraft structure as illustrated on FIG. 8 for example.

In this closed position, the space defined between the two arms, fixed arm 4 and movable arm 6, has a T-shaped section. Thus, on the base 2 side between fixed arm 4 and movable arm 6 there is a first space 16 of considerable width which becomes narrower and at the base of the T, a second space 18 of lesser width. In this way, each arm has a shoulder 20 extending parallel to base 2. Between its shoulder 20 and base 2, fixed arm 4 has a first vertical part 22 and beyond its shoulder 20, extending on the side opposite base 2, a second vertical part 24. Likewise, between its shoulder 20 and base 2, movable arm 6 has a first vertical part 26 and beyond its shoulder 20, extending in the direction opposite base 2 (in closed position of the device), a second vertical part 28.

The free end of first vertical part 26 bears a tubular part 30 intended to be positioned between the two bearings 12 of base 2. A spindle 32 extending both into bearings 12 and tubular part 30 makes it possible to connect movable arm 6 to base 2, forming a pivot connection.

Means are provided for locking movable arm 6 in its closed position shown on FIGS. 1 and 2. It is seen on FIG. 4 that shoulder 20 of movable arm 6 bears a hook on each side. In each instance this hook consists of a tab 34 extending vertically toward base 2 (FIG. 2) and the free end of tab 34 bears a prong 36 which forms a projection toward opposite tab 34.

To cooperate with the hooks of movable arm 6, base 2 has on its longitudinal edges 8, on the side of the end of the base bearing movable arm 6, in each instance a flange 38 extending vertically downward from base 2. In this way these two flanges 38 form two lugs on both sides of base 2.

Each flange 38 has an aperture 40 with shape adapted to the shape of corresponding prong 36. In the embodiment shown, apertures 40 have an elongated rectangular shape.

There also is seen on FIGS. 1 to 3 the presence of a groove 42 extending from the upper plane face of base 2 toward aperture 40. This groove 42 allows access to the corresponding hooks of movable arm 6 so as to permit unlocking of movable arm 6 in relation to base 2 with the aid of a screwdriver for example.

Fixed arm 4 has, between its shoulder 20 and its second vertical part 24, a rib 44 intended to facilitate grasping thereof.

As may be seen on the attached drawings, the device bears systems supports. Both fixed arm 4 and movable arm 6 are used for accommodating at least one systems support. Second vertical part 28 of movable arm 6 thus bears a first duct support 46. The latter is made up of a base 48 and a collar 50. Base 48 has an L-shaped sectional form. A branch of the L serves for fastening duct support 46 onto second vertical part 28 of movable arm 6, for example by screwing. As to the other branch of the base, it bears collar 50. The dimensions of the latter are, for example, adapted to the dimensions of an air duct customarily used in aeronautics.

In the embodiment shown on the drawings, as to fixed arm 4, it serves for fastening of electrical conduits 52. To this end, second conduit supports 54 are provided. It is seen for example on FIG. 5 that such a conduit support 54 is fastened onto rib 44. It is seen on this same Figure that fixed arm 4 has been adapted in its shape so as to also bear another conduit support 54. In the embodiment shown on the drawings, it has been chosen to extend second vertical part 24 of fixed arm 4 by an L-shaped tab 56. This tab 56 has a horizontal part extending from fixed arm 4 toward the exterior of the device and this horizontal part bears at its end a vertical part which extends upward toward base 2. This vertical part itself also bears a conduit support 54.

Each conduit support 54 comprises a base 58 topping a foot 60 and itself bearing two jaws 62. Base 58 has the shape of a curved band. Each of its two ends forms a hinge onto which a jaw 62 is jointed so as to be able to pivot in relation to base 58. Each of these jaws 62 also is in the overall shape of a curved band. The two jaws 62 are connected to one another by a third hinge.

On the Figures, conduit supports 54 are shown in closed position. In open position, jaws 62 are pivoted approximately 90° outward in relation to the position shown on the Figures and thus form a W. When an electrical conduit 52 comes to rest at the center of this W, jaws 62 close again to come into the position shown on the attached Figures and grip corresponding electrical conduit 52. It may be seen that by virtue of the presence of an outer tongue piece 64 associated with a set of hooks, conduit support 54 is locked in closed position, preventing any unintentional displacement of electrical conduit 52 out of the housing provided in conduit support 54.

Foot 60 of a second conduit support 54 comprises a circular support plate 66 from which there extends, on the side opposite base 58, a rod having a truncated head visible for example on FIG. 3. This is made of an elastic material such as rubber or a similar synthetic material. Its vertex forms a circle with diameter smaller than the diameter of a bore formed in fixed arm 4. As to the base of the truncated head, it forms a circle with diameter larger than the diameter of the said bore. In that way, by virtue of the elasticity of the material, the truncated head is able to go through the bore but its displacement, unintentional at least, is prevented.

FIGS. 5 and 8 illustrate the mounting of the device illustrated in FIGS. 1 to 4 on an aircraft structure. This structure comprises in particular a frame 68 onto which there is fastened an outer skin 70 (FIG. 8) with the aid of parts called stabilizers 72.

Frame 68 is a Z-shaped sectional piece. Reverting to the same orientation as in the preceding description, frame 68 thus has an upper flange 74, a core 76 and a lower flange 78. Frame 68 is a sectional piece with the shape of an arc of a circle. In a first approximation, it is assumed here, however, that it is a rectilinear sectional piece. In this approximation, it then is assumed that core 76 extends in a vertical plane (parallel to the vertical parts of fixed arm 4 and movable arm 6 (in closed position) and that, as to upper flange 74 and lower flange 78, they extend perpendicular to core 76 in a more or less horizontal plane.

A band 80 is fastened onto core 76, in the upper part thereof on the side opposite upper flange 74. This band 80 bears, evenly spaced, tongue pieces 82 which extend parallel and at the same height as upper flange 74. In this way, at a tongue piece 82 the assembly made up of frame 68, band 80 and corresponding tongue piece 82 forms an assembly having a t-shaped cross-section in its upper part.

The shape of each tongue piece 82 is adapted to the device according to this invention. In fact, as illustrated on FIG. 7, the dimensions of tongue piece 82 are adapted to the space situated between the two flanges 38 of base 2. In this way, these flanges serve on the one hand for locking the part of movable arm 6 on base 2 as described above, and on the other hand for positioning a device according to the invention on the structure of the aircraft. When the device according to the invention is in its closed position, first space 16 defined between fixed arm 4 and movable arm 6 near base 2 accommodates tongue piece 82 and upper flange 74. As to second space 18 of lesser width, it is disposed at core 76 of frame 68.

FIG. 8 illustrates the mounting of a device according to the invention on an aircraft structure, on the one hand holding an insulating blanket and on the other hand supporting two electrical conduits 52 and an air duct 84. On the right of FIG. 8, the presence of an insulating blanket against outer skin 70 is seen. Such an insulating blanket is in the form of a strip extending between two frames 68. Such a blanket generally is called skin blanket 86. To ensure a good continuity of the insulation, between two adjoining skin blankets, there also is provided an insulating blanket, called frame blanket 88 disposed around frame 68. The connection between frame blanket 88 and skin blanket 86 may be implemented, for example, by a hook-and-loop connection system better known under the trade name Velcro.

As may be seen on FIG. 8, the device shown on FIGS. 1 to 4 is positioned above frame 68 and frame blanket 88 which it comes to hold by clamping.

A cut-out may be provided in frame blanket 88 at each tongue piece 82: this would make it possible to index the position of the frame blanket in relation to the structure of the aircraft and would contribute to good holding of this blanket on the structure of the aircraft. Another arrangement of the blanket also may be provided at this place.

In the embodiment variant shown, electrical conduits 52 then are disposed on one side of frame 68 and air duct 84 on the other side of this frame. Of course, other configurations could be provided for the electrical conduits and the air duct. One could have a support for the air duct on the fixed arm and conversely at least one electrical conduit support on the movable arm. The same arm may bear supports for different systems.

Of course, for the installation of the device according to the invention, movable arm 6 is first of all pivoted in relation to the closed position shown on the drawings. Base 2 and fixed arm 4 then come to be positioned on the structure of the aircraft, coming to grip frame blanket 88. Then by having movable arm 6 pivot as far as its closed (and locked) position, clamping of frame blanket 88 onto frame 68 comes to be completed. Electrical conduits 52 and air ducts 84 preferably are positioned when all the devices according to this invention have been installed.

The device described above therefore allows holding of an insulating blanket on a frame as well as fastening of systems in relation to the structure of an aircraft. An advantage of this device is that it may be adapted easily, in particular as regards fastening of systems. As mentioned above, the systems supports are adjustable. The position of the conduits/ducts and the number thereof may be adapted. In this way, the device described above may be adapted to many solutions for passing through supported systems and may support all types of systems, even different from those shown on the drawings.

Mounting of a device according to the invention may be accomplished without tools, or at least without specific tools. Moreover, such a device is designed for being able to be easily remounted and dismantled in the same position as prior to dismantling.

Finally, a device according to this invention is easy and quick to implement. Mounting (and dismantling) time is limited. In addition, if a device according to the invention is made of synthetic material, it is possible to have a device with reduced weight, which of course is advantageous for a mounting in an aircraft.

This invention is not limited to the embodiment described above by way of non-limitative example, or to the indicated variants. It also relates to all the embodiment variants within the capacity of the individual skilled in the art in the context of the claims below.

The invention claimed is:

1. A device for holding an insulating blanket and for fastening systems in an aircraft, comprising:
    a base having two ends from each of which there extends an arm, one arm is a jointed arm that is jointed onto the base to be pivotable relative to the base, and
    at least one support configured to accommodate a system, wherein
    the base is configured to contour at least a portion of a flange of a frame of the aircraft, the base includes an elongated shape and defines a plane, the base includes two longitudinal edges, and at one end of the base, each longitudinal edge has a base flange extending from the base on a same side of the base from which the arms extend, and the arms are configured to sandwich at least a portion of a core of the frame.

2. The device according to claim 1, wherein a lock is provided between the jointed arm and the base.

3. The device according to claims 1 or 2, wherein the jointed arm has at least one elastic hook, and one base flange has at least one slot configured to cooperate with a corresponding elastic hook to hold the jointed arm in a predetermined position in relation to the base.

4. The device according to claim 3, wherein a groove extending from the plane of the base as far as the slot is made in the corresponding base flange.

5. An aircraft fuselage section, comprising:
    the frame, an outer skin fastened onto the frame, and at least one insulating blanket, wherein
    the at least one insulating blanket is fastened onto the frame with the aid of at least one device according to claim 1.

6. The aircraft fuselage section according to claim 5, wherein the frame is a sectional piece with a Z-shaped cross section with a core and two flanges, and at the end of the frame opposite the outer skin, the frame bears tongue pieces which extend more or less in a continuation of the corresponding flange but on a side opposite the core so as to form locally an end having a T-shaped section.

7. The aircraft fuselage section according to claim 6, wherein the two base flanges extending from the base are disposed on both sides of one of the tongue pieces.

8. An aircraft comprising:
at least one fuselage section according to one of claims 5 to 7.

* * * * *